United States Patent [19]
Vasudevan et al.

[11] Patent Number: 5,887,172
[45] Date of Patent: *Mar. 23, 1999

[54] REMOTE PROCEDURE CALL SYSTEM AND METHOD FOR RPC MECHANISM INDEPENDENT CLIENT AND SERVER INTERFACES INTEROPERABLE WITH ANY OF A PLURALITY OF REMOTE PROCEDURE CALL BACKENDS

[75] Inventors: Rangaswamy Vasudevan, Los Altos Hills; Caveh Jalali, Mountain View, both of Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 585,364

[22] Filed: Jan. 10, 1996

[51] Int. Cl.[6] ........................................ G06F 9/45
[52] U.S. Cl. ........................................ 395/684; 395/705
[58] Field of Search ........................................ 395/684, 705, 395/707, 708

[56] References Cited

U.S. PATENT DOCUMENTS

| | | | |
|---|---|---|---|
| 5,430,876 | 7/1995 | Schreiber et al. | 395/684 |
| 5,452,459 | 9/1995 | Drury et al. | 395/603 |
| 5,475,817 | 12/1995 | Waldo et al. | 395/683 |
| 5,497,463 | 3/1996 | Stein et al. | 395/200.03 |
| 5,499,343 | 3/1996 | Pettus | 395/200.2 |
| 5,511,197 | 4/1996 | Hill et al. | 395/683 |
| 5,526,491 | 6/1996 | Wei | 395/200.09 |
| 5,737,607 | 9/1995 | Hamilton et al. | 395/701 |

FOREIGN PATENT DOCUMENTS

| | | | |
|---|---|---|---|
| 266064 | 11/1991 | Japan | G06F 15/16 |
| 67865 | 3/1994 | Japan | G06F 9/06 |
| 301526 | 10/1994 | Japan | G06F 9/06 |
| 332830 | 12/1994 | Japan | G06F 13/00 |
| 282017 | 10/1995 | Japan | G06F 15/16 |

OTHER PUBLICATIONS

Reznik, Assaf, "Character Simulation with ScriptX", Dr. Dobb's Journal, p. 5, Nov. 1994.

Birrell, Andrew D. and Nelson, Bruce Jay, "Implementing Remote Procedure Calls", Xerox Parc., CSL–83–7, Dec., 1983.

Tanenbaum, Andrew S., "Remote Procedure Call", Computer Networks, Chapter 7, 2nd Edition, 1988.

IBM Technical Disclosure Bulletin, vol. 28, No. 9, Feb., 1986, pp. 3848–3855.

Jones, M.B, Rashid, R.F., Thompson, M.R., "Matchmaker: An Interface Specification Language for Distributed Processing", ACM, pp. 225–235, 1984.

*Primary Examiner*—Alvin E. Oberley
*Assistant Examiner*—St. John Courtenay, III
*Attorney, Agent, or Firm*—Fenwick & West LLP

[57] ABSTRACT

A system and method allow client applications to invoke remote procedures on a server application using any of a plurality of remote procedure mechanisms, by selecting a remote procedure call mechanism at runtime. The system and method uses client and server stubs in the application that include an mechanism-independent canonical specification of each procedure interface. The specification defines the form of the interface and arguments, but not does include conventional mechanism-specific marshalling arguments for marshalling the arguments. The resulting compiled stubs may be used with any remote procedure call engine. Such remote procedure call engines receive the specification of the procedure interface and the arguments passed by the client application to the server, and determine at runtime the particular marshalling routines to use, according to the canonical specification. This defers selection of the marshalling routines, and hence allows a single compiled client application binary code to be used with any of a variety of remote procedure call engines and marshalling routines. Deferring selection of marshalling routines further allows optimization of data types where the client and server computers share architectural characteristics. The system includes a interface definition language compiler that produces the client and server stubs having the canonical specification of the procedure interfaces, a virtual remote procedure library that selects a remote procedure call engine for a client, and plurality of remote procedure call engines.

25 Claims, 6 Drawing Sheets return_type vrpc_engine->send(vrpc state, interface specification, arguments)~302
├── vrpc state description ~380
│   ├── backend version ~381
│   ├── backend flags ~385
│   ├── backend name ~383
│   ├── state information ~387
│   └── destructor function ~389
├── interface specification ~324
│   ├── procedure number ~326
│   ├── procedure return type ~328
│   ├── number of arguments ~330
│   └── argument specification ~332
│       ├── argument mode ~334
│       └── argument type ~336
└── return_type ~340
    ├── success
    └── error

*FIGURE 3a*

```
return type vrpc_backend->method(optab_base_t, argument list) ~340
optab_base_t ~353
    vrpc_base ~351
        version ~350
        flags ~352
        size ~354
        name ~356
        type dictionary handle ~358
        vrpc backend handle ~360
        vrpc backend send method handle ~362
        vrpc backend control method ~364
    ≥1 client stub function pointers ~368
argument_list ~338
return_type ~340
    success
    error
```

*FIGURE 3b*

REMOTE PROCEDURE CALL SYSTEM AND METHOD FOR RPC MECHANISM INDEPENDENT CLIENT AND SERVER INTERFACES INTEROPERABLE WITH ANY OF A PLURALITY OF REMOTE PROCEDURE CALL BACKENDS

BACKGROUND

1. Field of Invention

The present inventions relates to client-server distributed computing systems generally, and more particularly, to systems providing multiple remote procedure call mechanisms dynamically selected at runtime to provide client-server interprocess communication and data transfer.

2. Background of Invention

Client-server computing has become the predominant model of distributed computing, paralleling the increasing performance of desktop computers and workstations. In a client-server distributed computing environment, multiple computers are connected in a network, and a computer may operate both as client, a consumer of resources and data, and a server, a producer of resources and data for the clients. Accompanying the spread of client-server systems, there has been a move away from the homogenous networks common in the past, where there was typically a single or very few vendors providing all the computers, to heterogeneous networks with computers, software, and peripheral devices from multiple vendors. In this environment, integration of client-server operation becomes a critical requirement.

In any client-server environment, a client requests operations of a server through a remote procedure call (RPC). In a remote procedure call, a process, the client, on a local computer invokes a process, the server, on a remote computer. Historically, the idea was to perform the remote procedure call with a single thread of control held by the client, so that the RPC behaved in the same manner as a local procedure call. In order to achieve this goal, there must be an agreed upon set of semantics between the client and the server for describing the procedure call and specifically, the arguments passed across the call. This is because both the client and the server may have different internal architectures for representing data, and thus, explicit specification of types of arguments is used to communicate data between the client and server. In addition, because the client and server typically are different computers, each with its own address space, passing parameters by reference is not usually possible. Conversion and construction of data for transmission between the client and server is called marshalling. In a general purpose RPC mechanism explicit typing is necessary, since implicit typing cannot be used unless a single RPC mechanism is chosen. In a heterogeneous environment, there may be multiple RPC mechanisms in use, and thus, explicit typing is needed. However, marshalling routines are specific to each RPC mechanism, since they are designed to construct the data for a particular and machine architecture RPC mechanism.

In conventional RPC systems, the client holds an interface to the server in the form of a client stub. The server has a server stub that provides the linkage to the server application. These stubs are created by the application developer by using the interface definition language (IDL) to specify the interface, and then compiled by an IDL compiler. The IDL is used to specify the interface between the client and the server. The client-server interface is conventionally defined as a set of procedures with specifically defined input and output arguments.

In conventional systems, the semantics of each remote procedure call are implemented when the stubs are compiled by the IDL compiler. The IDL compiler determines the specific marshalling routines for use with the arguments in a given procedure, and links these routines into the object code of the interface. The stub is then compiled into the application binary. The resulting, executable binary application code thus, can only be used with the particular RPC mechanism that uses the linked-in marshalling routines. At runtime, there is no ability to select which RPC mechanism to use when several are available, since the marshalling routines are already part of the application.

In a homogenous computing environment where there is a single RPC mechanism, this approach was acceptable. The selection of a single RPC mechanism ensured that all applications were developed to use just that mechanism. However, homogenous systems are no longer the typical environment. Rather now heterogeneous systems are commonplace where a single RPC mechanism becomes a limitation on the interoperability of clients and servers. Ideally then, a client application should be able to use the services of any server, regardless of the RPC mechanism. That is, where multiple RPC mechanisms are available on the system, the client should be able to select an RPC mechanism when the server is invoked.

With conventional RPC mechanisms, this is not possible because conventional RPC systems are incompatible and have incompatible APIs. While the individual RPC mechanisms in and of themselves support heterogeneous environments for different machine architectures, clients and servers do not support heterogeneous operating environments for different RPC mechanisms. More specifically, there are numerous distinct interface definitions languages, each with its own semantics, and with distinct compilers. Each IDL compiler is exclusively tied to a distinct RPC mechanism, and each RPC mechanism has its own particular set of marshalling routines for servers using the RPC mechanism. Marshalling routines of one RPC system cannot be used with another. Thus, existing applications that are compiled for use with a specific RPC mechanism cannot be used with another RPC mechanism. This prevents an application selecting an RPC mechanism at runtime.

To make the application interoperable with another RPC mechanism conventionally requires rewriting the interface of the server in the specific IDL of the new RPC, and then modifying and recompiling the application with the marshalling routine of the RPC. This process is expensive and time consuming, and results in the user having to choose which application to execute depending on which RPC mechanism is desired. The selection of RPC mechanisms is confusing to the user and inefficient.

Accordingly, it is desirable to use a mechanism that isolates the interface definition of the client-server interface from the RPC mechanism and marshalling routines, so that the RPC mechanism can be dynamically selected when the client is about to use the RPC mechanism on the server. Since the selection is performed at runtime, the client and server can select the RPC mechanism that best suits the operating environment on a per invocation basis. This allows the selection of RPC mechanism to be made at runtime, rather than at compile time, resulting in the desired heterogeneous system flexibility. Deferring selection of marshalling routines to invocation also makes clients and server more portable between hardware platforms and operating systems and allows the addition of new RPC mechanisms to an installed base without change to such mechanisms.

SUMMARY OF THE INVENTION

In one of its aspects, the present invention overcomes the limitations of conventional RPC systems by creating a canonical specification of a procedure interface at the time that the client or server stub is compiled. When the client stub is subsequently invoked to initiate the remote procedure call, this canonical specification is passed to a selected RPC engine which in turn determines how to marshall the arguments used in the interface and invoke the call. Only when the RPC engine is selected are the marshalling and invocation routines determined. Interpreting the canonical specification at runtime allows for the most optimal implementation of the specification, rather than fixing any form of the implementation at compile time. The resulting implementations from the invention, because they derive directly from the canonical specification, will offer higher performance than implementations derived from a predetermined set of marshalling and invocation routines.

With the interpreted canonical specification, the RPC engine marshalls the interface arguments (if and when necessary) and transmits them to the server by invoking the server stub. The server stub then unmarshalls data, interprets the canonical interface specification to determine the actual arguments and data types, executes the call, and returns the result arguments.

This process provides a "virtual" remote procedure call ("VRPC") system. The remote procedure call is "virtual" because the client stub does not have the specific implementation that marshalls the argument at the time of the call. The virtual remote procedure call system separates out the semantics of the procedure call, which are important to the RPC mechanism, from the syntax, which is important to the application developer. In addition, because the determination of RPC engine and the selection of marshalling routines is delayed until runtime, the canonical specification may be optimized where the client and server computers are of the same architecture, by using opaque data types rather than marshalling into machine independent representations. This optimization further improves the performance of the RPC mechanism.

In one aspect of the invention, the canonical specification is created by an interface definitional language compiler when the stubs are generated. The canonical specification describes the number of arguments, the data type and at least one argument mode in a machine independent manner. In one embodiment, the specification of data type is provided using an agreed set of bytecodes that define the representation format of the canonical specification. Complex data types are specified recursively. The actual data values for the interface arguments are not included in the canonical specification, but determined at runtime. The use of bytecodes enables the VRPC system to be independent of specific RPC mechanisms since the bytecodes define the argument datatypes independently of the machine architecture on which an arbitrary RPC mechanism is implemented. For example, a bytecode specifying an integer datatype may define it to be precisely two bytes in length. In contrast, in conventional programming languages, such as C, the programmer can define a variable to be an integer, but cannot specify that all integers are two bytes. Rather, the computer on which the program is compiled has its own internal format for storing the data and stores the integer in that predetermined format, and that storage format may be different from other integer formats on other computer architectures, even for the exact same program. With the bytecode specification of the present invention, regardless of how the client or server computer internally define an integer, it is stored in the same memory format.

Another aspect of the present invention is a virtual remote procedure call library and a number of virtual remote procedure call mechanisms, or "VRPC backends." Each VRPC backend corresponds to a specific RPC system and includes a virtual remote procedure call engine that performs that actual transfer of data across the network, and a set of marshalling routines. The VRPC library facilitates communication between a client stub and a server, o and enables the selection of VRPC backend by a client stub.

Because the selection of RPC mechanisms is deferred until runtime, the use of the VRPC system on a given client machine can be used to select any available RPC mechanism without the need for the VRPC system to be present on other server machines on the network. This provides various advantages, such as allowing any arbitrary RPC mechanism to work with the VRPC system, and thus allowing the client program to use any RPC mechanism without upgrading the server or recompiling the client program. In addition, the VRPC system allows individual client machines to be upgraded over time, without requiring all clients on a network to use the VRPC system. This reduces the cost and difficulty of migrating a large network to the VRPC system.

In another aspect of the invention, the use of canonical specifications enables the generation of wire-compatible protocols with existing and unmodified RPC servers of various types. Furthermore, existing interface definition language compilers can be modified to produce VRPC stubs without requiring any change in the underlying programming language. In addition, existing network and RPC-specific libraries may be used to guarantee RPC protocol compatibility.

BRIEF DESCRIPTION OF THE DRAWINGS

FIG. 3a is an illustration of a type hierarchy for the interface specification.

FIG. 3b is an illustration of the send call invocation of a VRPC engine.

DETAILED DESCRIPTION OF THE INVENTION

System Architecture

Figure 1:
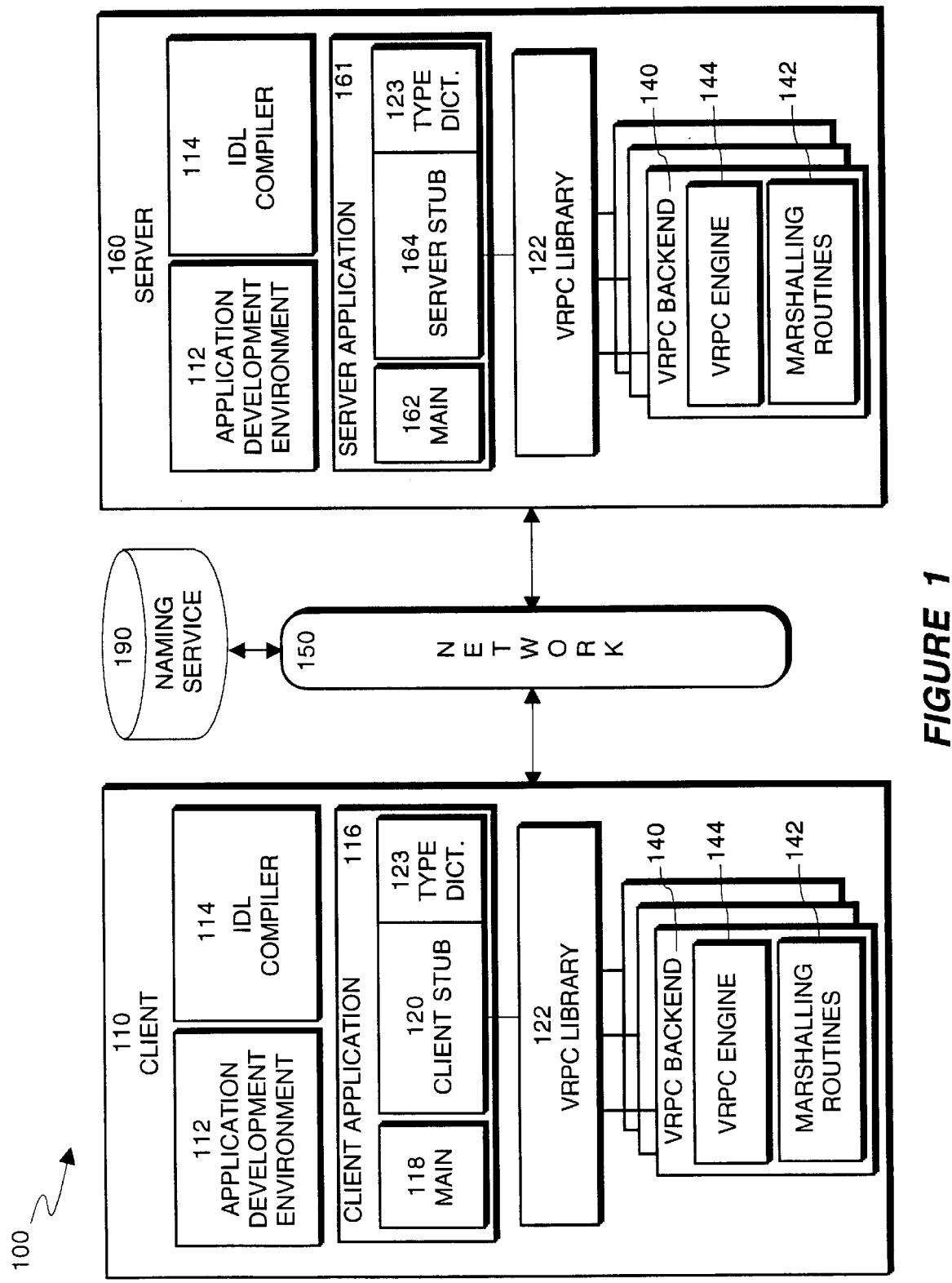
FIG. 1 is an illustration of a client-server distributed computing system in accordance with the present invention

Referring now to FIG. 1, there is shown one embodiment of the virtual remote procedure call system of the present invention in a client-server distributed computing system. The VRPC system 100 is a distributed client-server system capable of operating with heterogeneous machine architectures. System 100 includes client computers 110 (one client computer 110 is illustrated), coupled to server computers 160 through a network 150.

The client computers 110 may be conventional personal computers or workstations, such as Sun Microsystems Inc. SPARCstations, Intel-based x86 computers, IBM 390 or 400 series microcomputers, or the like. In the preferred embodiment, the client and server computers use Sun Microsystems' Solaris 2.x operating system, including the Open Network Computing Plus (ONC+) networking environment.

The client computers 110 provide both an application development and execution environment for developing application programs in accordance with the present invention. The application development environment 112 includes application programming tools such a code editor, a source code compiler, a linker, a syntax checker, and the like. In accordance with the present invention, an IDL compiler 114 is also provided. The IDL compiler 114 generates client and server stubs that are independent of any rpc mechanism. More particularly, a client stub has no dependencies on interface or network services that defines the marshalling of the input and output arguments of the client stub.

Rather, the client stub 120 and server stub 164 both include a canonical specification of their interfaces. The canonical specification defines in a machine and RPC-independent manner the data structures and interface routines for the client and server interfaces. The canonical specification uses explicit typing of data structures and interface routines. In the preferred embodiment, the explicit typing is provided by a bytecode specification that is understood by a variety of VRPC backends 140 and marshalling routines 142. The canonical specification is machine readable and can be executed by any VRPC engine 144 to communicate a data stream containing the arguments and data types of the interface between the client and server for a given remote procedure call. A type dictionary 123 created by the IDL compiler 114 and provided in the client 116 and server applications 161 stores the specific types used in the client and server stubs.

The bytecode specification in the client and server stubs are conventionally compiled with main application source code routines to generate client applications 116 and server applications 161. As compiled, stubs are executable by the application in a normal manner since the stubs have the appropriate syntax for interfacing with their applications.

In the execution environment, there is provided in the client 110 and server 160 computers a VRPC library 122, and a plurality of VRPC backends 140. The VRPC library 122 provides the communication linkage between the individual client stubs 120 and the server stubs 164 and one of the VRPC backends 140. The VRPC library 122 includes various routines that are invoked by either the client stub or server stub, as necessary to select a VRPC backend 140 and establish a connection therebetween. The routines dynamically select an available VRPC backend 140, passing to it the canonical representation of the interface and the data used by the stub. The selection process is determined at runtime, rather than during compilation of the stubs, as is done conventionally. The VRPC library 122 includes a service provider interface for the VRPC backends 140, so that any VRPC backend 140 can be substituted for any other.

Each VRPC backend 140 includes a VRPC engine 144 and marshalling routines 146. The VRPC engine 144 receives the canonical specification of the interface provided in the client 120 or server stub 164, along with handles to the data being passed, and calls the appropriate marshalling routines 142 to format the data structures and interface routines according to the bytecode specification in the canonical specification, passing the data values to the marshalling routine 142 since the marshalling routines 142 on the client share the same address space. The bytecode specification only defines the data structures of the interface, it does not specify how these are to be marshalled. Rather, each VRPC engine 144 is responsible for determining which marshalling routines 142 are used. In a preferred embodiment, there are multiple different VRPC backends 140, each specific to a single rpc mechanism, such as ONC-RPC supported by Sun Microsystems, or DCE-RPC, or the like.

The marshalling routines 142 marshall and unmarshall the passed in arguments, and return them to the VRPC engine 144. These routines are dynamically determined and invoked at runtime, rather than linked into the application binary itself. In this manner, the VRPC engine 144 is selected only when the client is invoked, not when the client stub 120 is generated by the IDL compiler 114 as in conventional systems.

A naming service 190 provides name to address translation for server applications 161 on the network 150. Each server application 161 on the network 150 has an address, maintained in the naming service 190, and optionally including a specification of which VRPC backend 140 is to be used with the server 161. The server applications 161 are preferably responsible for registering themselves with the naming service 190. The naming service 190 provides the name or address of a server in response to requests from other entities, such as the VRPC library 122 or client application 116.

Because the selection of VRPC engine 144 and marshalling routines 142 is deferred until runtime, any number of different VRPC engines 144 and marshalling routines 142 can be used with the same client 116 and server stubs 161, without having to recompile the stubs and application for the new rpc mechanism. This allows a single application binary to be distributed and be known to be compatible with current or future rpc mechanisms available on the network, thereby eliminating the cost and difficulty of converting each application to each specific rpc mechanism.

System Operation

Generation of Client and Server Stubs

Figure 2:
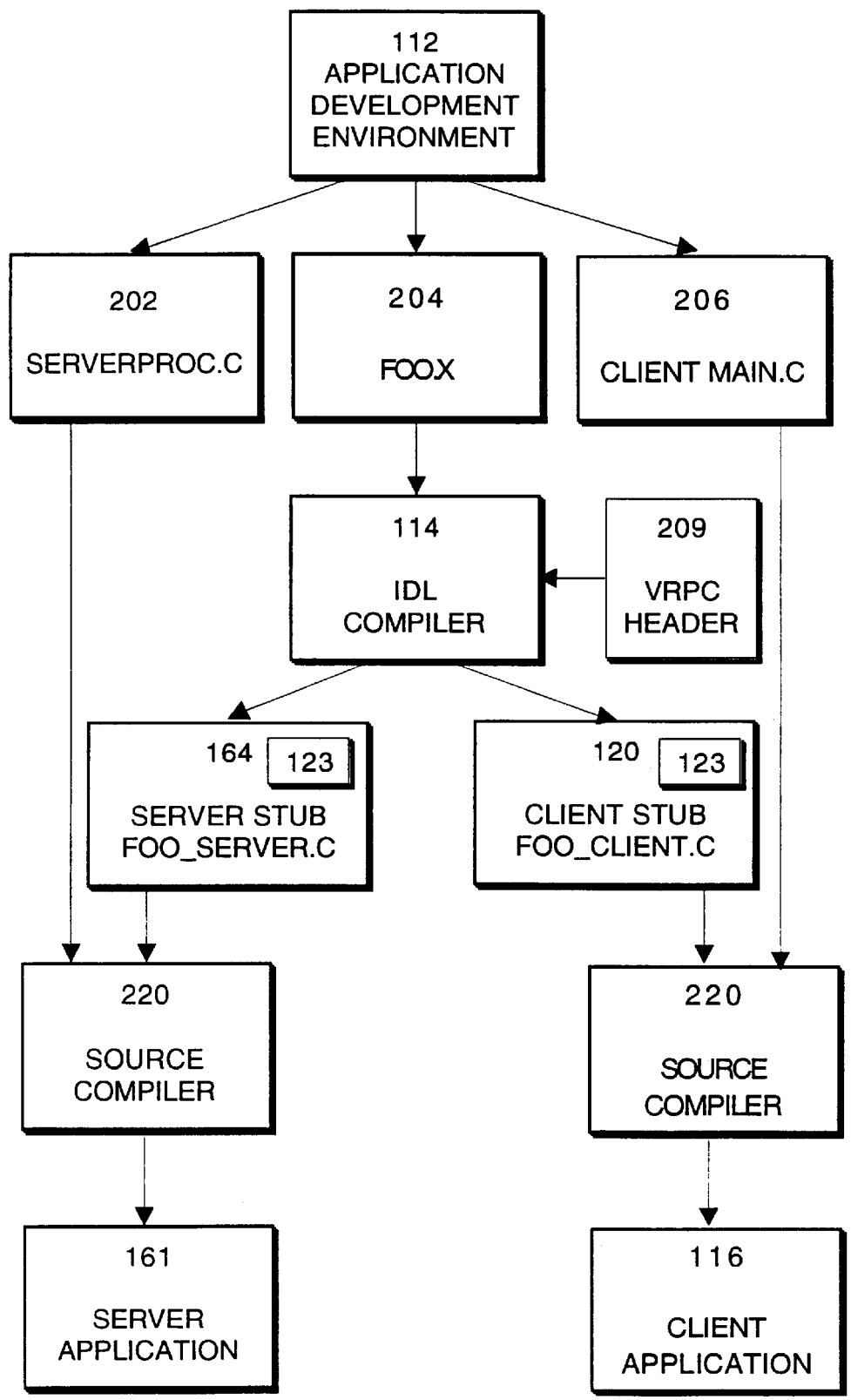
FIG. 2 is a data flow diagram of the process of generating client and server stubs.

Referring now to FIG. 2, there is shown a data flow diagram of the process of generating client 120 and server stubs 164. For the purposes of this disclosure, the present invention is described with respect to a development and execution of a single client stub 120 for a single application. Application to the general case will be understood by those of skill in the art.

The application developer, using the application development environment 112 produces a client application 116 and server application 161 generally as follows. The developer writes a client code 206 and server procedure code 202 in a conventional manner.

The developer further writes an interface specification for the client and server applications in an IDL language compatible with the IDL compiler. The interface specification defines a set of functions or procedures of the client and server, along with their input and output arguments. In accordance with the invention the, IDL compiler 114 is independent of the RPC mechanism, and so any IDL language compiler is acceptable. Suitable IDL languages includes DCE/RPC IDL, Microsoft's MIDL, CORBA IDL, Sun Microsystems ONC-RPC IDL. In FIG. 2, the interface specification file is illustrated generally by the file foo.x (204).

The IDL compiler 114 compiles the IDL specification file to produce a client stub 120, here foo_client.c and separately a server stub 164, foo_server.c. The stubs are source code files in a target source language and provide the source code level interfaces for the client and server.

More particularly, the IDL compiler 114 provides three functions. First, it parses a client-server interface specification described in the input IDL file. The typical IDL language is similar to procedural programming languages, but generally provides only structure declarations, function prototypes, and constant expressions. In the preferred embodiment, the IDL compiler 114 may include a number of different front end parsers, each one adapted for handling a different interface definition language.

Second, the IDL compiler 114 generates programming language specific bindings for the interface specification. This involves mapping parsed interface definitions to the specific programming language and operating system constraints of the execution environment. The language binding of an IDL describes how a particular function or data structure is translated from the IDL language to the target programming language. The output of the IDL compiler 114 is a source file providing a specification of the interface in a form that can be compiled with, and executed by the client and server applications. The preferred target source languages are C and C++.

Finally, the IDL compiler 114 generates the actual client and server stub code for the language bindings that performs the actual remote procedure calls. Unlike conventional IDL compilers 114 that produce stub code that includes calls to specific marshalling routines for marshalling the data structures of the interface, the stubs produced by the IDL compiler 114 do not specify the marshalling routines to be used for passing the input and output arguments. Rather, the stubs include the canonical specification of the data structures being passed between the client and the server. The canonical representation is maintained in a first data structure, an interface definition structure. The interface definition structure provides an abstract description of the format of the interface, including the data types of the number of input and output arguments, their number, and an identification of the remote procedure. The specification of the data types is provided by a bytecode; each of the VRPC engines 144 is capable of interpreting the bytecodes and determining the proper marshalling routines. A separate data structure or set of data structures is used to point to the argument values themselves.

The IDL compiler 114 further includes in the client stubs 120 calls to the VRPC library 122 and an abstract VRPC engine 144. These calls pass the interface specification to the VRPC library 122 and VRPC engine 144. Rather, the VRPC library 122 calls a selected VRPC engine 144 in one of the VRPC backends 140, to interpret or compile the implementation of the client interface, and the VRPC engine 144 performs the transformation of the specification into its implementation using its associated marshalling routines. The IDL compiler 114 also includes in a header file for the client stub 120 calls to establish and terminate a connection with the server 161.

The IDL compiler 114 further produces in the client stub 120 and the server stub 164 a type dictionary 123 that contains all of the data types used in the interface definition. Each data type in the type dictionary 123 is a defined by a series of bytecode sequences. This allows complex data types in the procedure interface to be represented by references to entries in the type dictionary 123. On the server side, the type dictionary 123 is used by the server stub 164 to reconstruct the data types of the raw data received during the remote procedure call.

FIG. 3*a* illustrates the type hierarchy of a preferred embodiment of the interface specification 324. The interface specification 324 is illustrated abstractly as an argument to an invocation of a send method of a VRPC engine 144. This invocation is used by the client stub 120 to invoke a selected VRPC engine 144 to make the actual remote procedure call to the server 161. In this embodiment, the interface specification 304 includes a description of the remote procedure interface and a description of the arguments to be supplied to the remote procedure. The description of the remote procedure interface includes:

an identifier 326 for a procedure number of the particular function procedure. A server interface will typically include a number of procedure calls available from the server. The IDL compiler 114 assigns each of these a unique identifier 326 so that the client and server can reliably exchange information about a specific procedure;

a variable 328 specifying the type of the return argument value for the remote procedure. This allows the remote procedure to determine the proper marshalling routine for the return value before sending it to the client; and, a variable 330 specifying the number of arguments being passed in the procedure call.

Appendix A includes an exemplary implementation of the type hierarchy of FIG. 3*a*. In that embodiment, the interface specification 324 is provided in the VRPC_proc_spec_t structure definition.

In the preferred embodiment the canonical description of the arguments is an argument specification 332 that includes a set of elements that describe each argument. The actual values of the arguments are not included in the argument specification 332, but only their form. For each argument, there is an argument type 336, and at least one argument mode 334. An argument mode 334 specifies the semantics for handling the arguments between the client and server. Generally, the modes define whether an argument is an input or output argument. In the preferred embodiment, the modes are refined to handle different types of relationships and optimization between the client and server. In a "lend" mode, the argument is provided to the server 161, which modifies it and returns the modified value back to the client 120. In a "lend to" mode, the server 161 receives a copy of the argument, and may use that value during the invocation of the remote procedure, and subsequently deallocates memory for that use. The client must still maintain the argument locally. In a "copy to" mode, a copy of the argument is sent to the server 161, which must free its copy upon completion. In a "copy from" mode, the client 116 does not send data to the server 161, but rather receives data having the defined data type. In a "move to" mode, the argument held by the client 116 is deleted after being sent to the server 161, and the server 161 frees this copy after use. Finally, in a "move from" mode, the server 161 passes data to the client 116 and deleted by the server, and the client 116 frees this instance after use.

An argument type 336 specifies data type for the argument (s). The data type is provided by a bytecode value. The bytecode is used to specify both primitive types, such as ints, chars, and the like, and more complex types that are recursively defined. Appendix A, Section 3.4 includes an exemplary list of bytecodes for representing primitive, pointer, and composed (complex) data types. Other bytecode specifications may also be used. These bytecodes are recognized by the VRPC engines 144, and used by the VRPC engines to select marshalling routines to marshall the arguments into the proper representation for transmission to the server, and then reconstruction by the server.

In the preferred embodiment, the argument specification structure 332 is included in the procedure interface specification 324, however, in an alternate embodiment, the argument specification structure 332 may be separated from the procedure interface specification. FIG. 3*a* illustrates this relationship. Appendix A provides an exemplary implementation of the argument specification 332, in the VRPC_args_spec_t structure.

Because the selection of marshalling routines according to the data types of the arguments is delayed until the actual invocation of the server interface, the bytecode specification may be optimized on a per-connection basis to take advantage of the architecture of the client and server computers. More particularly, if both the client and server computers are of the same architecture, such as both Sun Microsystems SPARCstations, then selected data type specific opcodes can be replaced with opaque data types, thereby eliminating the need to marshall the data into a machine independent format. For example, if the data type specified by an opcode is a double, it may be replaced by eight opaque bytes of data. It is significantly more efficient to transmit the eight opaque bytes than to convert a double into an machine independent representation, such as XDR (see below) and then convert back from the machine independent representation to the double. This optimization may be performed by the VRPC engine 144 that is selected at runtime.

As illustrated in FIG. 3a, the interface specification including the argument specification, is passed to a VRPC engine 144 by invoking its send method. When invoked, the VRPC engine 144 traverses the argument specification 332, and determines from the bytecode specification of the argument types 336 the appropriate marshalling routines. The VRPC engine 144 also separately receives the actual argument values 338. The VRPC engine 144 then calls the marshalling routines to marshall the arguments for transmission to the server 161. This process is further described below with respect to FIG. 4. The client stub 120 further passes to the VRPC engine 144 a state description 380 (FIG. 3) defining the transport parameters for the remote procedure call, and other information, such as the version number 381 of VRPC engine, the name 385 of the VRPC engine, flags 383 for controlling the backend, a handle to the state data 387, and a handle 389 to a destructor function for freeing this state information. An exemplary implementation of the VRPC state description is provided in Appendix A, §4.1.

A simplified example of a client stub 120 created by an IDL compiler 114 illustrating the canonical form of the interface definition is as follows. Assume that the client stub is to contain a function for summing two variables, A and B. In the IDL file foo.x this function is represented as:

int sum(int a, int b);

The IDL compiler 114 creates a canonical specification of this interface in the client stub in the file client.c:
1. # include "VRPC.h"
2. int sum VRPC_state *be(int a, int b) {
3. int tmp;
4. void *arg_addr[3];
5. arg_addr[0]=&a;
6. arg_addr[1]=&b;
7. arg_addr[2]=&tmp
8. be→send(VRPC_state, inter_descr, arg_addr)
9. return(tmp);
10. }

Line 2 defines the interface to the client stub seen by the client application. The interface is consistent with the application's interface as defined in the IDL file. This allows the application to invoke the client stub without the applications developer having to provided any further interfaces between the application and the stub. The body of the stub is hidden from the application, and the application has no information that the sum procedure is being remotely handled. Line 1 specifies the header file which includes the calls for establishing and terminating a connection with a VRPC engine 144. The header file is further described below.

Line 3 defines the output variable, tmp. This allows the client to have a local handle to a variable for returning the result from the remote procedure to the application. Line 4 defines an array arg_addr that is sized to contain pointers to the two input and one output arguments. In the general case, the argument array contains a pointer for each input and output argument. More generally, in the preferred embodiment, the client stub receives all arguments as pass by reference, including arrays and non-arrays. The argument array corresponds to the argument list 338 in FIG. 3a.

Lines 5 through 7 define the contents of the arg_addr array, with pointers to the passed in variables a and b, and a pointer to the output variable tmp. In the preferred embodiment, the client stub accepts all arguments as pass by reference, whether these are array or non-array arguments. This arguments array will be passed to one of the VRPC engines and selected marshalling routines. Since these components all reside in the same address space as the client stub, they will be able to access the data values of the argument as needed when the data structures of the interface are marshalled at runtime.

Line 8 performs the remote procedure call itself. This call corresponds to the server interface 302 in FIG. 3a. The canonical specification of the interface is provided as an input argument inter_descr to the send_call function, with inter_descr being an interface specification 324, be is a function pointer to one of the VRPC engines, any of which provide a send_call function. The send_call function passes down the interface specification 324, inter_descr, which here contains a description of the sum function. The send_call further passes the data that accompanies the interface definition, the arg_addr array. When the remote procedure call is completed, the result will be in the temporary variable tmp. As shown in FIG. 3a, the remote procedure call has a return type 340 that indicates whether the remote procedure call was successful or whether there was an error.

For this example of the function sumo, the simplified version of the interface specification 324 would be:

struct {
    int proc_no 1;
    int n_args =3;
    struct arg_spec args [2]={(IN, int_bytecode) (IN, int_bytecode), (OUT, int_bytecode)};
    } inter_descr;

where arg_spec is a structure that implements the argument specification described above. The mode values of "IN" and "OUT" are merely illustrative here, and other argument mode values may be used, as described above. Exemplary mode values are described in Appendix A, §3.2, in the VRPC_param_mode_t structure definition. The procedure number, return type, type, and number arguments are determined by the IDL compiler 114.

As noted above, the interface specification 324 does not contain any of the data being passed between the client and server, but merely the form of that data. Because the data are not included in the canonical representation, this representation can be provided to any VRPC engine 144 for marshalling. Only when the marshalling at runtime is actually performed is the data accessed from the arguments array.

The client stub described here is a simplified representation of the interface of the client. FIG. 3b illustrates an abstract representation of the interface for this invocation. In a preferred embodiment, the invocation 340 of the VRPC library 122 passes in a data structure, here called optab_base_t 353, that encapsulates both the interface specification and argument specification, and an argument list. In addition, the VRPC library 122 receives arguments specifying the version 350 for the client stub 120, flags 352 for setting switches in the library if necessary, the size 354 of the encapsulating structure, for use in marshalling the arguments, a handle 358 to the type dictionary used for the interface, and handles to call the VRPC engine 144 directly for state information (360), its send method 362, and its control method 364. The control method 364 is a general function which the VRPC library 122 uses to instruct the VRPC backend 140 to perform additional functionality. For example, the control method 364 may be used to instruct a VRPC backend 140 to select the security level for a connection between the client and server.

In addition, a set of function pointers 368 to the client stub 120 are also provided for main routine 118 to call. The VRPC engine 144 also receives the argument list 338 with the actual arguments references for the VRPC engine 144 to marshall. The VRPC engine 144 returns a value 340 indicating whether the remote procedure was successful, or whether an error resulted.

When the client application 116 first connects with the server, the client invokes the VRPC library 122 to establish a connection and select a VRPC engine 144. The VRPC library 122 initializes the be handle with the address for a selected VRPC engine 144, and client stub function pointers to interface routines. Accordingly, when the client stub 120 is subsequently invoked, it is provided a handle to the VRPC engine 144 which can then marshall the data structures of the interface according to the interface specification structure. The selection process for choosing a VRPC engine 144 at runtime is further described below. The client 116 invokes the VRPC library 122 using interfaces provided in a header file incorporated in all client stubs 120.

The VRPC library 122 provides two basic functions to the clients: initiation/termination of a connection between client/server and selection of a VRPC engine 144. The interfaces to these functions are provided to a client stub 120 in the VRPC header file 209. More particularly, there is a function to establish a connection to the server using a selected VRPC engine 144. This function takes as an input the name of a server to be conducted, generally provided on the server computer 160, and a handle to the client/server interface being accessed. This function invokes the VRPC library 122 on the client computer 110, which obtains from naming service 190 the name and address of a server 161 including a VRPC engine 144 specified for use by the server application 161 having the server interface. The VRPC library 122 then initializes state variable handle be for contacting the server using that VRPC engine 144. Otherwise, the VRPC library 122 returns a error value. The VRPC library 122 returns the handle to the VRPC backend 140 to the client stub 120. An exemplary interface for this function is VRPC_begin( ) function described in Appendix A, §1.1. Note that the call to VRPC_begin( ) takes an optab_base_t 353 as an argument, thereby providing to the VRPC library 122 the handle to the interface specification and the argument specification in the client sub 116.

A complementary function terminates a remote procedure call connection through the VRPC engine 144 specified the handle obtained from initiation function. This function is called by the application 166 at the end of its execution. An exemplary interface is shown in Appendix A, §1.1 as VRPC_end( ).

Exemplary implementations of the VRPC library 122 functions are illustrated in Appendix A, §1.1.

Execution of Clients and Selection of a VRPC Mechanism

Figure 4A:
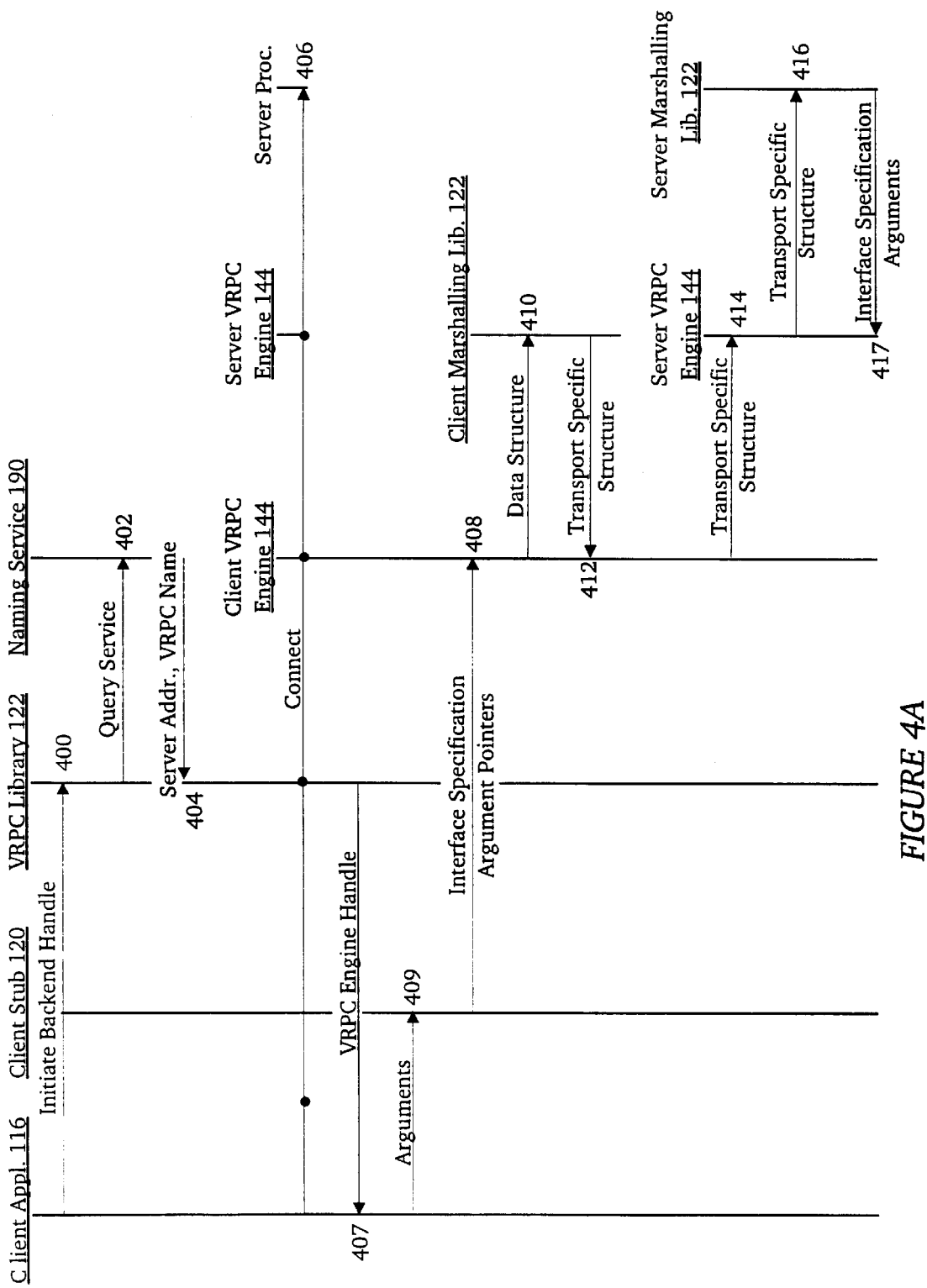
FIGS. 4a and 4b are an event trace and data flow diagram of the process of invoking a VRPC engine.
Figure 4B:
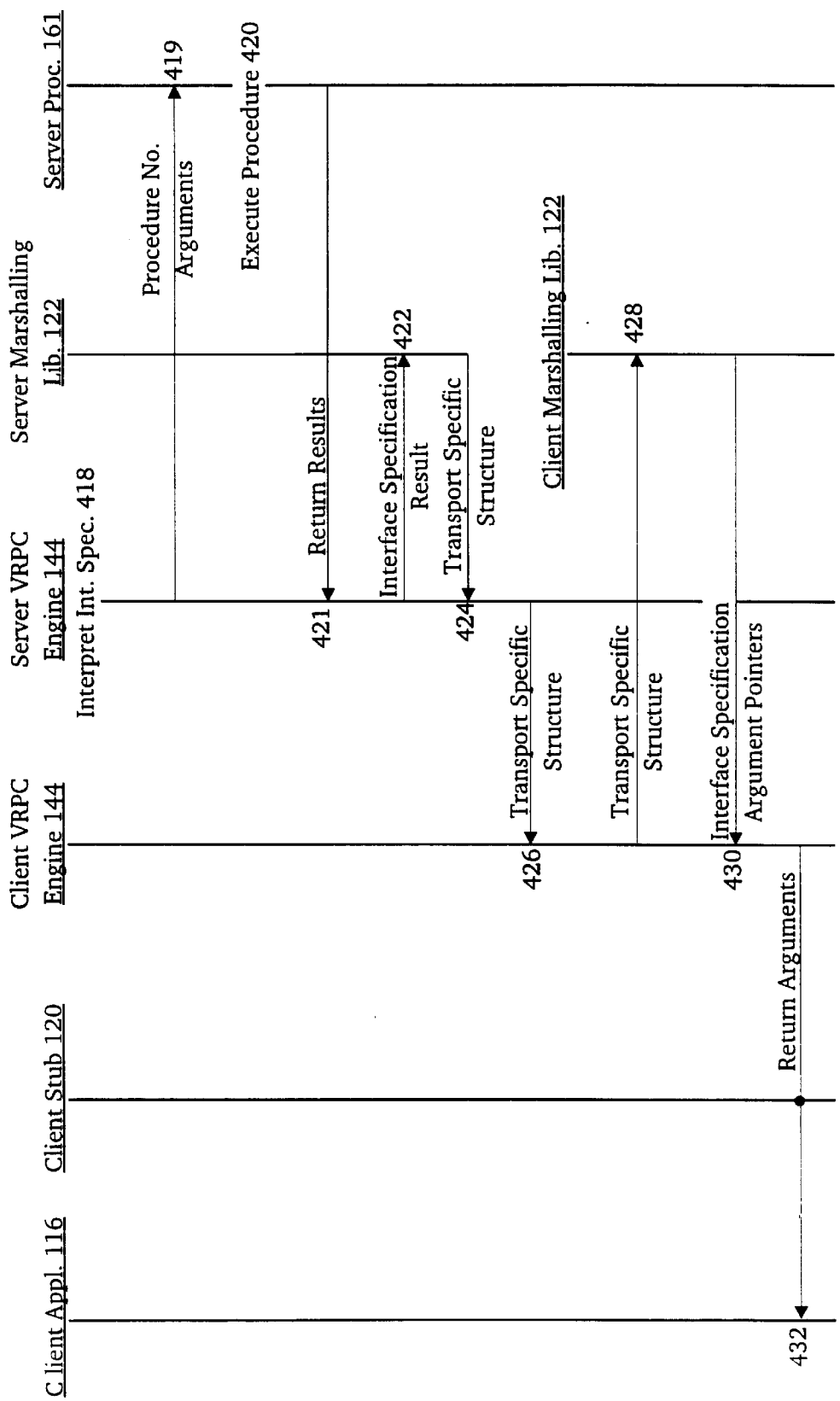

Referring now to FIGS. 4a and 4b there is shown an event trace and data flow diagram of the process of executing a remote procedure call in accordance with the present invention. The client application 116 containing the remote procedure call is executed on a client computer 110 in a conventional manner. The application 116 includes a call to initialize the handle in the client stub 120 to the VRPC backend 140 used to invoke the backend's send_call method. The application 116 invokes 400 this initialization method, for example VRPC_begin( ), on the VRPC library 122, passing in an identification of a server interface being accessed. The VRPC library 122 is responsible for determining the VRPC engine 144 to be used and establishing a connection to the server application 161 using the VRPC engine 144. The VRPC library 122 queries 402 the naming service 190 for the server address and name of the VRPC backend 140. The naming service 190 returns 404 the address of the server 161 and the name of the VRPC backend 140, which the VRPC library 122 then uses to select the VRPC engine 144. Generally, the selection of the VRPC engine 144 is based on the address of the server or the backend name before the connection to the server is established. The address, or the name retrieved from the naming service 190 identifies the specific RPC mechanism to use, and the library 122 knows how to interpret the address from the naming service 190. The client 116 then connects 406 to the server 161 by calling the VRPC library 122, which then establishes the connection to the server 161 with the selected VRPC engine 144 on the client computer 110, and correspondingly with a VRPC engine 144 on the server computer 160. For example, if the address indicates an ONC-RPC mechanism, the library 122 will load in the ONC-RPC backend, and so on. As a consequence of connection being established, the VRPC engine 144 is loaded by the client computer 110. The VRPC library 122 will obtain a handle to the VRPC engine 144 once the VRPC engine 144 is loaded. The VRPC library 122 returns 407 this handle to the client stub 120 so that future invocations of send_call will be made directly on the selected VRPC engine 144.

At some subsequent point, the main routine 118 invokes 409 the client stub 120 by calling one of the procedures defined therein, and passing in some number of arguments. The client stub 120 packages the actual arguments and the argument specification to create the procedure call, specifying the argument mode(s) and type of each argument, and the procedure description, specifying the procedure number, number of arguments, return type. The client stub 120 then invokes 408 the send_call method. This call is forwarded by the VRPC library 122 to the selected VRPC engine 144 on the client computer 110.

The VRPC engine's 144 on the client computer 110 interprets the interface specification to determine the form of each argument, including its mode(s) and data type according to the bytecode specification. The interpretation further determines from the procedure number the appropriate procedure to invoke on the server 161. From this information, the client's VRPC engine 144 selects the appropriate marshalling routines from the client computer 110 marshalling library 122 for marshalling the arguments into a form that can be transmitted across the network to the server application 161. The VRPC engine 144 invokes 410 these marshalling routines as needed to create the proper representation of an input data structure. Each marshalling routine returns 412 a transport specific data representation for the input data structure. The invocation of the marshalling routines is specific to the VRPC engine 144. In one embodiment based on Sun Microsystems ONC-RPC, the marshalling routines use the data representation specified in XDR: External Data Representation Standard RFC 1104, June 1987. In this environment, the VRPC engine 144 invokes a function clnt_call( ) of the ONC-RPC mechanism that performs the client side of the remote procedure call for any application:

clnt_call(procedure number, *datastruct, *XDRfun, *datastruct, *XDRfun))

This marshalling call specifies the procedure number for the procedure being serviced, and provides pointers to data structures and the marshalling and unmarshalling functions.

Where the client computer 110 and the server computer 160 are of the same architecture, the client VRPC engine 144 may optimize the bytecodes by using opaque data types, rather than marshalling with the marshalling routines.

The VRPC engine 144 on the client computer 110 then sends 414 the marshalled data and arguments to the instance of the VRPC engine 144 on the server computer 160. The VRPC engine 144 on the server computer 160 unmarshalls 416 the arguments using the marshalling library 122 on the server computer 160. Referring to FIG. 4B, the marshalling library 122 returns 417 original interface specification to the server's VRPC engine 144.

The VRPC engine 144 on the server computer 160 interprets 418 the interface specification, using its type dictionary 123, which corresponds to the type dictionary used by the client side VRPC engine 144. This allows the server's VRPC engine 144 to reconstruct the specific data structures of the original arguments, along with identifying the specific procedure to be invoked in the server application. The VRPC engine 144 passes 419 the arguments in the form specified by the interface specification, and procedure number to the server application 161. The server 161 executes 420 the remote procedure on these arguments to obtain the desired result. The server 161 returns 421 the result to the server VRPC engine 144. The server VRPC engine 144 again marshalls 422, 424 the result according to the interface specification, and sends 426 the marshalled data back to the client VRPC engine 144. The client VRPC engine 144 unmarshalls 428, 430 the data with the client marshalling library 122, and forwards 432 the return arguments to the client stub 120, which passes the result to the client application 116.

The VRPC Interface

Sun Microsystems, Inc. Proprietary information.
Copyright © 1995 Sun Microsystems, Inc.

Table of Contents

1 VRPC Client Interface .......................... 1
   1.1 Client Initiation ............................................ 1
   1.2 Client Stub API ............................................ 2

2 VRPC Server Interface .......................... 3
   2.1 Server Initiation ........................................... 3

3 Interface Specification Mechanism ............. 4
   3.1 Virtual Data Representation ............................... 4
   3.2 VDR Internals ............................................. 4
   3.3 Type Dictionary ........................................... 6
   3.4 VDR Bytecode (Type System) ............................. 7
       3.4.1 Canonical Types ................................... 7
       3.4.2 Pointer Types ..................................... 8
       3.4.3 Composed and Meta Types ....................... 9

4 VRPC Backend Interface ....................... 10
   4.1 Interface ................................................. 10
   4.2 Backend Support Routines ................................ 11
   4.3 ONC/RPC Opcodes ...................................... 12
   4.4 Membuf Opcodes ........................................ 12

Functions Index ................................. 14

Data Types Index ............................... 15

Concepts Index ................................. 16

Chapter 1: VRPC Client Interface 1

1 VRPC Client Interface

1.1 Client Initiation

These functions are declared in the following header file:
include <vrpc/vrpc.h> void * vrpc_begin (const char *name, const void       Function
    *clnt_ops)
Establish VRPC connection.

name is used to query a naming system to identify and locate the server process.

clnt_ops identifies the interface being accessed. It is the address of a appl_optab_t as found in the compiler generated file 'appl_vclnt.c'.

vrpc_begin() returns a pointer to an initialized appl_optab_t, or nil on error.

int vrpc_end (void *opsp)       Function
Terminate a VRPC connection initiated by vrpc_begin().

opsp is a pointer previously obtained from vrpc_begin().

vrpc_end() returns 0 on success and -1 on error.

int vrpc_begin_buf (const char *name, const void       Function
    *clnt_ops, void *opsp, size_t ops_sz)
Establish VRPC connection.

name is used to query a naming system to identify and locate the server process.

clnt_ops identifies the interface being accessed. It is the address of a appl_optab_t as found in the compiler generated file 'appl_vclnt.c'.

ops is the address of an appl_optab_t to be initialized. Its size is passed as the next argument. Its size must match the object pointed to by clnt_ops.

ops_sz is the size of the structure pointed to by opsp.

vrpc_begin_buf() returns 0 on success and -1 on error.

int vrpc_end_buf (void *opsp)       Function
Terminate a VRPC connection initiated by vrpc_begin_buf().

opsp is the address of a structure previously initialized by vrpc_begin_buf().

vrpc_end_buf() returns 0 on success and -1 on error.

Chapter 1: VRPC Client Interface

1.2 Client Stub API

For each remote function defined in the IDL, a client stub routine is generated. Calling this stub function causes the appropriate server function to be invoked with the same arguments; the result of the server routine is returned by the client stub routine.

int opsp->method (appl_optab_t *opsp, args...)                Function
    Make an RPC call. Invokes function method as defined in the IDL.

opsp is a pointer to an appl_optab_t as initialized by vrpc_begin_buf() (see Chapter 1 [Client API], page 1).

args are the actual RPC arguments. Note that the VRPC client stub routines all accept arguments as pass-by-reference arguments. All non array arguments are passed by reference. Arrays are also passed by reference, but no additional translation is performed since C already passes arrays by reference.

Also note that return function values are passed back in the last argument of the argument list. In other words, the function value is converted to a pass-by-reference variable.

method() returns 0 on success and -1 on error.

Each 'appl_vclnt.c' file contains an interface definition. The definition is of type appl_optab_t and is conventionally placed in a variable called APPL_optab.

appl_optab_t                                                  Data type

```
typedef struct {
         optab_base_t   base;
         int            (*func)(appl_optab_t *,
                                const func_arg *, int *func_res);
         ...
} appl_optab_t;
``` base is of type optab_base_t as described below (see Section 3.2 [VDR Internals], page 4).

func each appl_optab_t has one or more members which are function pointers. These are initialized by the compiler generated code to client stubs which perform the corresponding RPC.

The appl_optab_t has function pointers to the client stubs. Each of these client stubs calls the be_send_call routine for that appl_optab_t with the appropriate arguments. One of these arguments is a vrpc_proc_spec_t.

This page under construction.

Chapter 2: VRPC Server Interface

2 VRPC Server Interface

2.1 Server Initiation

These functions are declared in the following header file:
```
#include <vrpc/vrpc.h>
``` void * vrpc_begin (const char *name*, const void *clnt_ops*)   *Function*
Establish VRPC connection.

*name* is used to query a naming system to identify and locate the server process.

*clnt_ops* identifies the interface being accessed. It is the address of a *appl_optab_t* as found in the compiler generated file '*appl_vclnt.c*'.

vrpc_begin() returns a pointer to an initialized *appl_optab_t*, or nil on error.

This page under construction.

3 Interface Specification Mechanism

3.1 Virtual Data Representation

VRPC uses a Virtual Data Representation scheme to describe application data structures and procedures. Simply put, data structures and procedures defined in an IDL are translated into a specification language which is machine readable. This language consists of specific opcodes (see Section 3.4.1 [bytecode1], page 7) much like a common assembly language.

Since the specification is machine readable, these opcodes can be *executed* by a VRPC backend to properly communicate a data stream between the client and server for a remote procedure call.

Additionally, specific *optimizers* can be invoked on a per-connection basis to optimize the byte-code in a way suitable for the architectural characteristics of the client and server machines.

For example, if the peer machines are of the same architecture (eg. SPARC), then the optimizer can replace most data type specific opcodes in the VDR with opaque data types. For example, a double can be replaced with 8 opaque bytes. It is significantly more efficient to communiate 8 opaque bytes than to convert a double into (for example) XDR and then do the translation from the common format back to a double.

3.2 VDR Internals optab_base_t                                                     Data type

```
typedef struct {
        unsigned long           _version;
        unsigned long           _flags;
        size_t                  _size;
        const char              *name;
        const vrpc_tdict_t      *vdr_tdict;
        vrpc_be_ops_t           *b_be_handle;
        int                     (*b_send_call)(vrpc_be_ops_t *,
                                    const vrpc_proc_spec_t *,
                                    void *ap[]);
        int                     (*b_ctrl)(optab_base_t *, int, void *);
} optab_base_t;
```

_version is the version number (1).

_flags option flags (0).

_size is the size of the encapsulating *appl_optab_t*.

Chapter 3: Interface Specification Mechanism name is the string name of the interface described by the encapsulating appl_optab_t.

vdr_tdict is a pointer to the VRPC type dictionary for this interface (see Section 3.3 [typedict], page 6).

b_be_handle is a VRPC backend handle.

b_send_call backend routine that makes RPC call.

b_ctrl backend control routine.

vrpc_proc_spec_t                                Data type

```
typedef struct {
        unsigned long           opnum;
        unsigned long           rtype_id;
        unsigned long           nargs;
        const vrpc_args_spec_t  *args;
} vrpc_proc_spec_t;
``` opnum the procedure number or unique identifier for this procedure within the scope of this interface.

rtype_id the type ID of the return value of this function, or 0 if the return type is void.

nargs the number of arguments this function takes. Also the number of entries in the args array.

args an array of nargs vrpc_args_spec_ts.

vrpc_args_spec_t                                Data type

```
typedef struct {
        vrpc_param_mode_t       mode;
        unsigned long           type_id;
} vrpc_args_spec_t;
``` mode The parameter passing mode.

type_id The type ID of the argument.

vrpc_param_mode_t                               Data type

```
enum {
        PM_LEND,
        PM_LEND_TO,
        PM_COPY_TO,
        PM_COPY_FROM,
        PM_MOVE_TO,
        PM_MOVE_FROM
} vrpc_param_mode_t;
```

Chapter 3: Interface Specification Mechanism 6

PM_LEND The argument is sent to the server, where it is modified, and the modified value is copied back to the client. In a shared memory implementation, this may be implemented as pass-by-reference.

PM_LEND_TO A copy of the argument is sent to the server. The VRPC runtime frees the server's copy of the arguments when the RPC invocation has completed on the server. The client side instance is not freed.

PM_COPY_TO A copy of the argument is sent to the server. The server side application code must free its copy. The client side instance is not affected.

PM_COPY_FROM No data is sent from the client to the server, but data is returned from the server to the client. The server side instance is not freed. The client must free the copy it receives.

PM_MOVE_TO Client side instance is deleted after call. Server side must free instance. In shared memory implementation, the object is not freed, however, responsibility for freeing object moves from client to server.

PM_MOVE_FROM Server side instance is deleted after call. Client side must free instance. In shared memory implementation, the object is not freed, however,responsibility for freeing the object moves from the server to client.

3.3 Type Dictionary

Each `appl_vdr.c` file contains a dictionary of the types represented in that file. The dictionary is of type vrpc_tdict_t and is conventionally called *APPL_typetab*.

The dictionary is simply an array of pinters to opcode sequences. Each of these opcode sequences defines a data type of the interface. When data types are nested, the referene to the nested data type takes the form of an index into the type dictionary.

vrpc_tdict_t Data type

```
typedef struct {
        unsigned long          nctypes;
        const vrpc_opcode_t    *const *ctype;
} vrpc_tdict_t;
``` nctypes Number of type entries in ctype ctype Each array entry points to a sequence of vrpc_opcode_ts. Each of these sequences describes a data type used in this VRPC interface specification.

Chapter 3: Interface Specification Mechanism

3.4 VDR Bytecode (Type System)

Each VRPC backend implements a subset of the following opcodes:

3.4.1 Canonical Types

VRPC_bool32 *offset*
a 32 bit boolean.
VRPC_byte *offset*
opaque byte.
VRPC_int8 *offset*
8 bit char
VRPC_int16 *offset*
16 bit short
VRPC_int32 *offset*
32 bit long
VRPC_int64 *offset*
64 bit long
VRPC_uint8 *offset*
8 bit unsigned char
VRPC_uint16 *offset*
16 bit unsigned short
VRPC_uint32 *offset*
32 bit unsigned long
VRPC_uint64 *offset*
64 bit unsigned long
VRPC_enum8 *offset*
an 8 bit enum (eg. C++ support)
VRPC_enum16 *offset*
a 16 bit enum
VRPC_enum32 *offset*
a 32 bit enum
VRPC_enum64 *offset*
a 64 bit enum
VRPC_float32 *offset*
a 32 bit float
VRPC_float64 *offset*
a 64 bit float Chapter 3: Interface Specification Mechanism 8

VRPC_float128 *offset*
    a 128 bit float
    VRPC_char8 *offset*
    an 8 bit character
    VRPC_char16 *offset*
    an 16 bit character
    VRPC_char32 *offset*
    an 32 bit character
    VRPC_zchar8 *offset*
    an 8 bit zero terminated character
    VRPC_zchar16 *offset*
    an 16 bit zero terminated character
    VRPC_zchar32 *offset*
    an 32 bit zero terminated character

3.4.2 Pointer Types

Each of these items describes the type of a pointer. The *offset* is that of the pointer value.

VRPC_string8 *offset*
    a '\0' terminated string of 8 bit chars
    VRPC_string16 *offset*
    a string of 16 bit chars
    VRPC_string32 *offset*
    a string of 32 bit chars
    VRPC_string8M *max-len offset*
    a '\0' terminated string of 8 bit chars
    *max-len* defines length to malloc for string, excluding '\0' terminator
    VRPC_string16M *max-len offset*
    a string of 16 bit chars
    VRPC_string32M *max-len offset*
    a string of 32 bit chars
    VRPC_pointer1 *ptr-offset type-instr*
    pointer to 1 instance of *type-instr*
    VRPC_pointerN *n-count ptr-offset type-instr*
    pointer to *n-count* instances of *type-instr*

Chapter 3: Interface Specification Mechanism 9

VRPC_pointerL *len-instr val-offset type-instr*
    pointer to L instances of *type-instr*
    VRPC_pointerML *max-count len-instr val-offset type-instr*
    pointer to len-instr() instances in buf of size *max-count*
    VRPC_appl
    a pointer to an upcall routine

3.4.3 Composed and Meta Types

VRPC_nop
    do nothing.
    VRPC_nest *type-id offset*
    a reference to another type
    VRPC_vector *count type-instr*
    fixed sized array of length *count* of type *type-instr*
    VRPC_array
    an array
    VRPC_struct *struct-size struct-name*
    a struct
    VRPC_estruct
    end of a struct
    VRPC_SunionC *union-size union-offset disc-instr ncases default-type-id (case, type-id)*
    union-in-struct with cases
    VRPC_RTerror
    force runtime error

4 VRPC Backend Interface

4.1 Interface

A VRPC backend is expected to export the following interface. The backend must be implemented as a shared library that the VRPC library can dlopen().

The shared library must have an entry point (function) which uses its arguments to construct and return a pointer to a vrpc_be_ops_t.

**vrpc_be_ops_t * vrpc_create_*ADDR* (const**           Function
    vrpc_tdict_t \**ty*, const void \addr-info*)**

*ADDR* is the actual name assigned to the particular VRPC backend.

*TY* is the application's type dictionary (see Section 3.3 [typedict], page 6).

*addr-info* is some backend specific address information. This information may be used to connect to the RPC server.

vrpc_create_*ADDR*() returns the address of an initialized vrpc_be_ops_t or nil on error.

Note that the destructor for this data type is called using a funciton pointer within the data type.

vrpc_be_ops_t           Data type

```
typedef struct {
        unsigned long   _be_version;
        unsigned long   _be_flags;
        const char      *be_name;
        vrpc_be_state_t *be_data;
        void            (*be_untransport)(vrpc_be_state_t *);
} vrpc_be_ops_t;
```

This type is used to hold state information for a VRPC backend.

be_flags is used to hold state flags.

be_version is used to indicate the backend version.

be_name holds the name of the backend.

be_data is used by the backend to store a pointer to its own private state information.

be_untransport points to a destructor function for be_data. When it is non nil, it is called by the VRPC runtime with be_data as an argument when the vrpc_be_ops_t is destroyed.

Chapter 4: VRPC Backend Interface                                11

4.2 Backend Support Routines const op * peek_int (const op *ip, const void *dp,         Function
        unsigned long *res)
    This function returns an integer from memory. It is typically used
    to determine the dimension of dynamically sized arrays and discriminators in unions. The instruction sequence must consist of canonical types.

*ip* points to the instruction sequence describing the type of integer to read.

*dp* points to the user's data structure (integer).

*res* points to where the read integer is returned.

peek_int() returns the value of the advanced *ip*.

const op * poke_int (const op *ip, const void *dp,         Function
        const unsigned long *val)
    This function writes an integer to memory. It is typically used to
    set the dimension of dynamically sized arrays and discriminators in
    unions. The instruction sequence must consist of canonical types.

*ip* points to the instruction sequence describing the type of integer to write.

*dp* points to the user's data structure (integer).

*val* points to the integer value to be written to memrory.

poke_int() returns the value of the advanced *ip*.

size_t size_at (const op *const *tdict, const op *ip)      Function
    This function returns the size of an object described in VDR.

*tdict* points to the type dictionary to be used.

*ip* points to the instruction sequence describing the object.

size_at() returns the size of the object in bytes.

const op * skip1_at (const op *ip)                         Function
    This function advances the instruction pointer to the next VDR instruction.

*ip* points to the instruction sequence to be skipped.

skip1_at() returns the value of the advanced *ip*.

const op * has_pointer (const op *const *tdict,            Function
        const op *ip, int *res)
    This function examines the pointed to object and decides whether the
    described object contains any pointers.

*tdict* is the type dictionary.

Chapter 4: VRPC Backend Interface

*ip* is the address of the VDR description of the object to be examined.

*res* points to an int where this function returns its value. It is set to TRUE if a pointer is found, and FALSE if no pointers are found.

has_pointer() returns the value of the advanced *ip*.

4.3 ONC/RPC Opcodes

The following opcodes are implemented by the ONC/RPC backend module.

VRPC_RTerror
VRPC_SunionC
VRPC_bool32
VRPC_byte
VRPC_enum32
VRPC_estruct
VRPC_float{32,64,128}
VRPC_nest
VRPC_nop
VRPC_pointerML
VRPC_pointerN
VRPC_string8
VRPC_string8M
VRPC_struct
VRPC_vector
VRPC_{,u}int{8,16,32}

4.4 Membuf Opcodes

The following opcodes are implemented by the Membuf backend module. Note that the Solaris/Doors backend is built on top of the membuf backend.

VRPC_RTerror
VRPC_SunionC
VRPC_bool32
VRPC_byte
VRPC_enum32
VRPC_estruct
VRPC_float{32,64,128}

Chapter 4: VRPC Backend Interface 13

VRPC_nest
    VRPC_nop
    VRPC_pointerML
    VRPC_pointerN
    VRPC_string8
    VRPC_string8M
    VRPC_struct
    VRPC_vector
    VRPC_{,u}int{8,16,32}

Functions Index 14

Functions Index

H
has_pointer ........................ 11

O
*opsp->method* ........................ 2

P
peek_int ........................... 11
poke_int ........................... 11

S
size_at ............................ 11
skip1_at ........................... 11

V
vrpc_begin ....................... 1, 3
vrpc_begin_buf ..................... 1
vrpc_create_*ADDR* ................. 10
vrpc_end ........................... 1
vrpc_end_buf ....................... 1

Data Types Index 15

Data Types Index

A
appl_optab_t .......................... 2

O
optab_base_t .......................... 4

V
vrpc_args_spec_t ...................... 5
vrpc_be_ops_t ........................ 10
vrpc_param_mode_t ..................... 5
vrpc_proc_spec_t ...................... 5
vrpc_tdict_t .......................... 6

Concepts Index 16

Concepts Index

B
Backend Interface .................... 10

C
Client API ........................... 1
Client Stub API ...................... 2

M
Membuf Opcodes ..................... 12

O
ONC/RPC Opcodes ................... 12

Opcodes .............................. 7

S
Server API ........................... 3

T
Type Dictionary Layout ............... 6

V
VDR Theory .......................... 4

We claim:

1. An interface definition language compiler, for use with a computer system providing at least one remote procedure call mechanism-independent system for execution of a procedure in a server, the procedure invoked by a client and taking zero or more arguments, wherein the interface definition language compiler receives an interface definition file including a declaration of the interface of the procedure, and converts it to a remote procedure call mechanism-independent canonical specification which specifies a description of the interface such that a procedure call conforming to any arbitrary remote procedure call mechanism can be constructed therefrom at substantially the same time as the invocation of the procedure by the client the canonical specification including an identification of the procedure in the server, and for each argument included in the interface, a specification of a data type of the argument and at least one argument mode for passing the argument and defining the semantics for using the argument in the procedure, the compiler producing a client stub including the canonical specification, the client stub adapted to be compiled into the client for execution thereby.

2. The interface definition language compiler of claim 1, wherein the interface definition language compiler produces a server stub adapted to receive the canonical specification of the interface of the procedure, and determine therefrom for each argument a data type at least one argument mode for the argument for providing the arguments to the server procedure, and for returning an output argument to the client stub.

3. The interface definition language compiler of claim 1, wherein the argument modes include an input mode and an output mode.

4. The interface definition language compiler of claim 1, wherein the argument modes include a lend mode and a lend to mode.

5. The interface definition language compiler of claim 1, wherein the argument modes include a move to mode and a move from mode.

6. The interface definition language compiler of claim 1, wherein the argument modes include a copy to mode and a copy from mode.

7. The interface definition language compiler of claim 1, wherein the canonical specification includes an interface specification comprising:
    a specification of a procedure identifier that uniquely identifies the procedure in the server;
    a specification of the number of arguments; and,
    a specification of a return type for the output argument of the server procedure.

8. The interface definition language compiler of claim 1 operating with a computer system comprising:
    plurality of marshalling routines;
    a client remote procedure call engine and a server remote procedure engine, the remote procedure engines providing a transport mechanism between the client stub and a server stub of the server procedure; and,
    wherein the interface definition language compiler produces in the client stub an invocation to the client remote procedure call engine to provide thereto the canonical specification, the client remote procedure call engine adapted to invoke selected marshalling routines according to the data types of the arguments specified in the canonical specification to marshall values for the arguments into transport specific structures, the client remote procedure call engine further adapted to provide the transport specific structures to the server remote procedure engine which invokes selected marshalling routines to obtain the argument value and data types, and provides the argument values and data types to the server stub.

9. The interface definition language compiler of claim 7, wherein the data type of each argument is specified by a bytecode representation.

10. The interface definition language compiler of claim 9, wherein:
    the interface definition language compiler produces a type dictionary including an entry for each unique data type, the entry including bytecode representation specifying the data type; and, p1 the argument specification includes for the data type of each argument a reference to an entry in the type dictionary.

11. A computer system for executing in a server application a remote procedure call by a client application, comprising:
    a client side computer including:
        a client application including a client stub to the remote procedure, the client stub receiving zero or more arguments from the client application, and having an invocation that passes a remote procedure call mechanism-independent canonical specification to a client remote procedure call engine, the canonical specification of the interface of the remote procedure including:
            a procedure identifier uniquely identifying the remote procedure in a server interface of a server;
            for any argument specified in the interface of the remote procedure an implementation and machine independent argument specification of a data type of the argument, and at least one argument mode for passing the argument and defining the semantics for using the argument in the procedure; and,
            a set of references, each reference for obtaining a value to an argument;
        a first plurality of marshalling routines, each marshalling routine associated with a specific client remote procedure call engine, and adapted to marshall an argument value by constructing for the argument value a representation of the argument value that is specific to the client remote procedure call engine and determined by the data type of the argument;
        at least one client remote procedure call engine, each client remote procedure call engine capable of receiving the canonical specification, and determining from the argument specification of the data type of each argument at the time the remote procedure call is executed, each client remote procedure call engine adapted to invoke for each argument in the canonical specification at least one marshalling routine associated with the client remote procedure call engine to marshall the argument, the client remote procedure call engine invoking the marshalling routine only when the client remote procedure call engine is invoked by client stub, and the client remote procedure call engine determined at substantially a same time as when the client application is executed.

12. The computer system of claim 11, further comprising:
    a server side computer including:
        a server application including the remote procedure;
        a server stub providing the interface to the remote procedure;
        a second plurality of marshalling routines, each marshalling routine associated with a specific server remote procedure call engine to be invoked thereby, and adapted to unmarshall an argument to determine its argument value and data type;

at least one server remote procedure call engine adapted to receive from a client remote procedure call engine each marshalled argument, the server remote procedure call engine invoking at least one marshalling routine of the second plurality to unmarshall the argument to determine the argument data type and argument value, the server remote procedure call engine providing the argument value and data type of each argument to the server stub.

13. The system of claim 12, further comprising:

an interface definition language compiler that produces from the interface of the server procedure the client stub and server stub.

14. The system of claim 13, further comprising:

a type dictionary including an entry for each unique data type in each canonical specification of the server interfaces, a bytecode representation, and the canonical specification of the server interfaces includes for the argument type of each argument a reference to an entry in the type dictionary.

15. A computer implemented method of creating an application stub for compilation into an application, the application stub interfacing the application to a remote procedure call mechanism for executing a procedure call defined in the application stub, the method comprising:

receiving an interface definition of the procedures the interface definition including zero or more input or output arguments;

converting the interface definition to a remote procedure call mechanism-independent canonical specification which specifies a description of the interface such that a procedure call conforming to any arbitrary remote procedure call mechanism can be constructed therefrom at substantially the same time as the invocation of the procedure, the conversion comprising:

specifying an identification of the procedure in the server; and specifying for each argument included in the interface a data type of the argument and at least one argument mode of the argument; and, providing the canonical specification in the application stub.

16. The method of claim 15, further comprising:

providing in the application stub an invocation of a client remote procedure call engine, the invocation passing to the client remote procedure call engine the canonical specification.

17. The method of claim 15, further comprising:

creating a server stub to receive the arguments specified in the application stub, and provide the arguments to a server application including the server procedure.

18. The method of claim 15, further comprising:

creating a type dictionary that includes an entry for each unique data type in the canonical specification, the entry including a bytecode representation of the data type, such that the canonical specification includes for the data type of each argument a reference to an entry in the type dictionary.

19. The method of claim 18, wherein the type dictionary is provided to both a client application including the client stub, and a server application including the server procedure.

20. In a computer system including a client computer and a server computer, a computer readable memory for the client computer configured to provide a remote procedure call between the client computer and the server computer, comprising:

a client application including a client stub to the remote procedure, the client stub receiving zero or more arguments from the client application, and having an invocation that passes a remote procedure call mechanism-independent canonical specification to a client remote procedure call engine, the canonical specification of the interface of the remote procedure including:

a procedure identifier uniquely identifying the remote procedure in a server interface of a server;

for any argument specified in the interface of the remote procedure an implementation and machine independent argument specification of a data type of the argument, and at least one argument mode for passing the argument and defining the semantics for using the argument in the procedure; and, a set of pointers, each pointer for obtaining a value to an argument;

a first plurality of marshalling routines, each marshalling routine associated with a specific client remote procedure call engine, and adapted to marshall an argument value by constructing for the argument value a representation of argument value that is specific to the client remote procedure call engine and determined by the data type of the argument;

at least one client remote procedure call engine, each client remote procedure call engine capable of receiving the canonical specification, and determining from the argument specification of the data type of each argument at the time the remote procedure call is executed, each client remote procedure call engine adapted to invoke for each argument in the canonical specification at least one marshalling routine associated with the client remote procedure call engine to marshall the argument, the client remote procedure call engine invoking the marshalling routine only at a time when the client remote procedure call engine is invoked by the client stub, and the client remote procedure call engine determined at substantially a same time as when the client application is executed.

21. The computer readable memory of claim 20, further comprising:

an interface definition language compiler that produces from the interface of the server procedure the client stub.

22. The computer readable memory of claim 20, further comprising:

a type dictionary including an entry for each unique data type in each canonical specification of the server interfaces, a bytecode representation, and the canonical specification of the server interfaces includes for the argument type of each argument a reference to an entry in the type dictionary.

23. In a computer system including a client computer providing a client application and server computer providing a server procedure, a computer implemented method of providing a remote procedure call from the client application to the server procedure, comprising;

invoking the server procedure through a server interface in a client stub in the client application, and providing to the server procedure a number of arguments;

invoking a remote procedure call engine, and providing thereto a remote procedure call mechanism-independent canonical specification which specifies a description of the interface such that a procedure call conforming to any arbitrary remote procedure call mechanism can be constructed therefrom at substantially the same time as the invocation of the procedure by the client, the canonical specification describing for each of the number of arguments, a data type of the argument and at least one argument mode for passing the argument and defining the semantics for using the argument in the server procedure;

marshalling each of the arguments according to its data type with marshalling routines selected by the remote procedure call engine; and, providing the marshalled arguments to the server procedure.

24. The method of claim 23, further comprising:

selecting the remote procedure call engine at substantially a same time as the invocation of the server procedure from among a plurality of remote procedure call engines according to a designation of a remote procedure call engine associated with the server procedure.

25. The method of claim 23, further comprising:

determining whether the server computer and the client computer have a common architecture;

selecting arguments from the invocation and providing opaque data types for the arguments instead of marshalling the argument with selected marshalling routines; and, providing the opaque data types to the server procedure.

* * * * *